(12) United States Patent
Franz et al.

(10) Patent No.: US 7,784,591 B2
(45) Date of Patent: Aug. 31, 2010

(54) DEFINED BRAKE PAD ABUTMENT

(75) Inventors: Scott Franz, Clawson, MI (US); Charles C. Giacomazza, Ypsilanti, MI (US); Eduardo Morais, South Lyon, MI (US); William J. Vander Roest, Ann Arbor, MI (US)

(73) Assignee: Kelsey-Hayes Company, Livonia, MI (US)

(*) Notice: Subject to any disclaimer, the term of this patent is extended or adjusted under 35 U.S.C. 154(b) by 1155 days.

(21) Appl. No.: 11/375,844

(22) Filed: Mar. 15, 2006

(65) Prior Publication Data
US 2007/0215419 A1 Sep. 20, 2007

(51) Int. Cl.
*F16D 65/02* (2006.01)

(52) U.S. Cl. .................. 188/73.38; 188/73.36

(58) Field of Classification Search .... 188/73.36–73.38
See application file for complete search history.

(56) References Cited

U.S. PATENT DOCUMENTS

| | | | | |
|---|---|---|---|---|
| 5,649,610 A | * | 7/1997 | Shimazaki et al. | 188/73.38 |
| 5,699,882 A | * | 12/1997 | Ikegami et al. | 188/73.38 |
| 5,901,815 A | * | 5/1999 | Kobayashi et al. | 188/7 |
| 5,954,163 A | * | 9/1999 | Suzuki et al. | 188/73.38 |
| 6,003,642 A | * | 12/1999 | Mori et al. | 188/73.44 |
| 6,223,866 B1 | * | 5/2001 | Giacomazza | 188/73.38 |
| 6,478,122 B1 | * | 11/2002 | Demoise et al. | 188/73.38 |
| 7,040,464 B1 | * | 5/2006 | Andrews et al. | 188/73.38 |

FOREIGN PATENT DOCUMENTS

| | | |
|---|---|---|
| DE | 10312478 | 10/2004 |
| DE | 10312479 | 10/2004 |
| DE | 10312480 | 10/2004 |

\* cited by examiner

*Primary Examiner*—Christopher P Schwartz
(74) *Attorney, Agent, or Firm*—MacMillan, Sobanski & Todd, LLC (57) ABSTRACT

A brake pad assembly includes a brake pad including a base portion, a first ear portion, and an opposed second ear portion. The first ear portion and the second ear portion extend outwardly from the base section. The first ear portion includes a first upper section, a first central section, and a first lower section. The second ear portion includes a second upper section, a second central section, and a second lower section. A first clip receives the first ear portion and a second clip receives the second ear portion. The first ear portion includes a first defined contact location and a second defined contact location in relation to the first clip. The second ear portion includes a third defined contact location in relation to the second clip.

18 Claims, 6 Drawing Sheets

DEFINED BRAKE PAD ABUTMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates in general to vehicle brakes and in particular to a brake pad having defined abutment contact points.

2. Description of the Related Art

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The structures of these drum brake assemblies and disc brake assemblies, as well as the actuators therefore, are well known in the art.

A typical disc brake assembly includes a rotor which is secured to the wheel of the vehicle for rotation therewith. A caliper assembly is slidably supported by pins secured to an anchor bracket. The anchor bracket is secured to a non-rotatable component of the vehicle, such as the vehicle frame. The caliper assembly includes a pair of brake shoes which are disposed on opposite sides of the rotor. The brake shoes are operatively connected to one or more hydraulically actuated pistons for movement between a non-braking position, wherein they are spaced apart from opposed axial sides or braking surfaces of the rotor, and a braking position, wherein they are moved into frictional engagement with the opposed braking surfaces of the rotor. When the operator of the vehicle depresses the brake pedal, the piston urges the brake shoes from the non-braking position to the braking position so as to frictionally engage the opposed braking surfaces of the rotor and thereby slow or stop the rotation of the associated wheel of the vehicle.

The brake pad includes a pair of ear portions that project outwardly from a main portion of the brake pad. Each of the ear portions are disposed within respective grooves formed in each respective anchor bracket. The ear portions are typically square or rectangular shaped as are the receiving grooves in the anchor bracket. Gaps are formed between the sides of each ear portion and the respective receiving grooves. The locations of contact between the sides of each ear portion and respective receiving grooves, as well as the gaps, vary due to tolerances in the components and variations in the installation and assembly of the vehicle brakes.

When the brakes are applied, as described above, the piston urges the brake pads into contact with the braking surface of the rotor. As the brake pads contact the braking surface of the rotor, the induced torque biases the braking pad in a forward direction (i.e., same direction as the rotation of the respective wheel). This, in turn, will cause each of the ear portions to move within its respective groove in the direction of the applied torque. Each ear will transition from a non-braking contact abutment point(s) to a braking contact abutment point(s) within the respective groove. The braking abutment contact points vary from brake pad to brake pad because the originating non-braking contact abutment point(s) are not the same, as discussed above.

In a braking system having noise, vibration, and harshness (NVH) concerns, one of the factors which causes difficulty in pinpointing the source of the NVH concern is when contact abutment surfaces between a respective ear portion and a respective groove vary from one brake pad to the next. If the variations in contact locations between the brake pads were to be eliminated—that is, the abutment surfaces had abutment contact surface repeatability—NVH concerns originating from the braking shoes would be easier to diagnose.

BRIEF SUMMARY OF THE INVENTION

The present invention has the advantage of maintaining defined and repeatable contacting location between ear portions of a brake pad and respective abutting clips. Maintaining defined and repeatable contact locations between both abutting surfaces assists in diagnosing NVH concerns during braking operations.

In one aspect of the present invention, a brake pad assembly includes a brake pad including a base portion, a first ear portion, and an opposed second ear portion. The first ear portion and the second ear portion extend outwardly from the base section. The first ear portion includes a first upper section, a first central section, and a first lower section. The second ear portion includes a second upper section, a second central section, and a second lower section. A first clip receives the first ear portion and includes a first upper side surface, a first central side surface, and a first lower side surface. A second clip receives the second ear portion and includes a second upper side surface, a second central side surface, and a second lower side surface. The first ear portion includes a first defined contact location and a second defined contact location in relation to the first clip. The second ear portion includes a third defined contact location in relation to the second clip.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
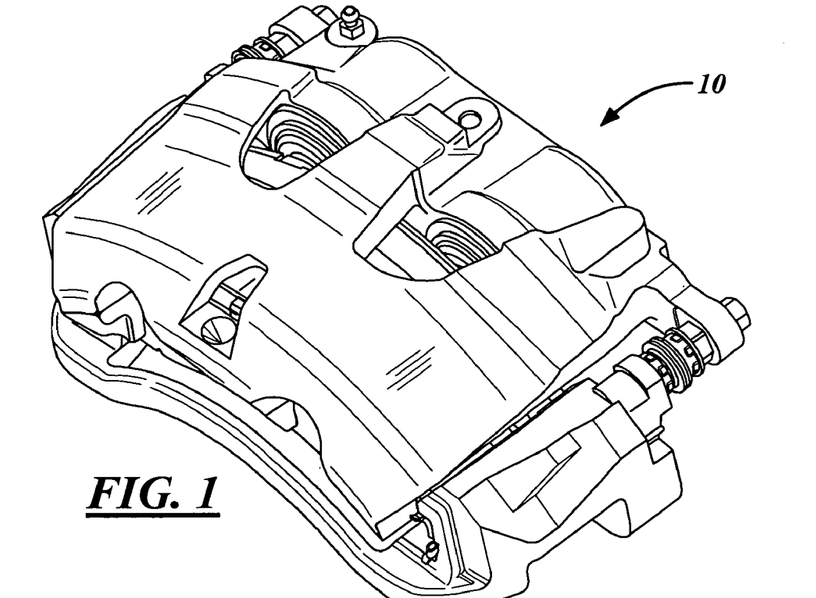
FIG. 1 is a perspective view of a disc brake assembly according to a first preferred embodiment of the present invention.

Referring now to the drawings, there is illustrated in FIG. 1 a disc brake assembly, shown generally at 10, for applying braking friction to a braking rotor (not shown) of a vehicle (not shown).

Figure 2:
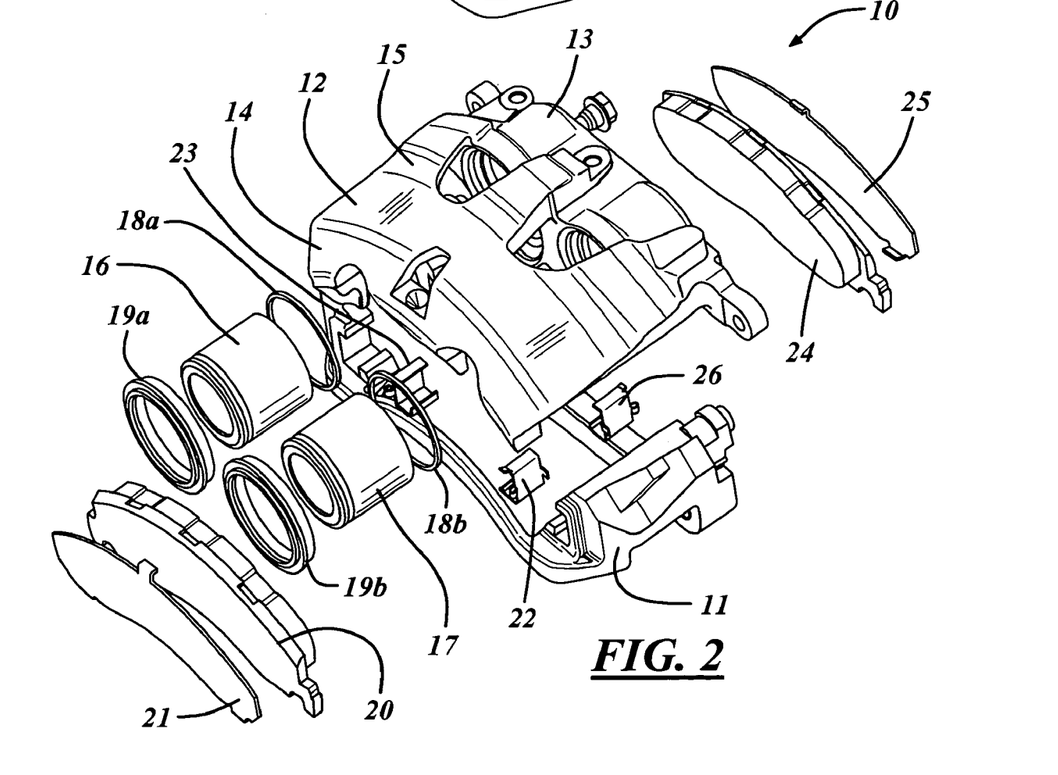
FIG. 2 is an exploded view of the disc brake assembly of FIG. 1.

FIG. 2 illustrates an exploded view of the disc brake assembly 10. The disc brake assembly 10 includes an anchor plate 11 and a caliper 12. The caliper includes an inner leg portion 13 and an outer leg portion 14 connected by a bridge section 15. A pair of hydraulic actuators, namely a first piston 16 and a second piston 17 connect to hydraulic ports (not shown) of the inner leg portion 13. Alternatively, the disc brake assembly may include a single piston caliper, a single opposed caliper, a dual fixed opposed caliper, or two or more piston calipers of varying configurations may be utilized.

A first seal 18a and a second seal 18b are disposed between the first piston 16 and the second piston 17 and the respective hydraulic ports, respectively, for creating a sealed surface between the hydraulic ports and first and second pistons 16 and 17. A first dust seal 19a and a second dust seal 19b are coupled to exposed ends of the first piston 16 and the second piston 17, respectively. The first dust seal 19a and the second dust seal 19b prevent dust and other contaminants from forming on the end portions of the first and second pistons 16 and 17.

An outer brake pad 20 and an outer backing plate 21 are supported by the anchor plate 11. A first clip 22 and a second clip 23 are adapted to mate with end portions of the outer brake pad 20. The first clip 22 and second clip 23 assist in retaining the outer brake pad 20 to the anchor plate 11 in addition to preventing rattling of the outer brake pad 20.

An inner brake pad 24 and an inner backing plate 25 are also supported by the anchor plate 11. A third clip 26 and a fourth clip (not shown) are adapted to end portions of the inner brake pad 24. The third clip 26 and fourth clip assist in retaining the inner brake pad 24 to the anchor plate 11 in addition to preventing rattling of the inner brake pad 24.

When pressurized hydraulic fluid is forced against the first piston 16 and second piston 17, the inner brake pad 24 is urged against the brake rotor (not shown) for applying a braking friction force to the rotor. An inward force is also applied by the caliper 12 to the outer brake pad 20 for urging the outer brake pad 20 against the brake rotor for applying a braking friction force to the rotor. The direction that each respective brake pad will have a tendency to rotate (torque) as braking is applied, of course, depends upon the direction of rotation of the brake rotator, the position of the outer brake pad 20 and inner brake pad 24 to the brake rotor, and the position of each respective brake pad to the pistons.

Figure 3:
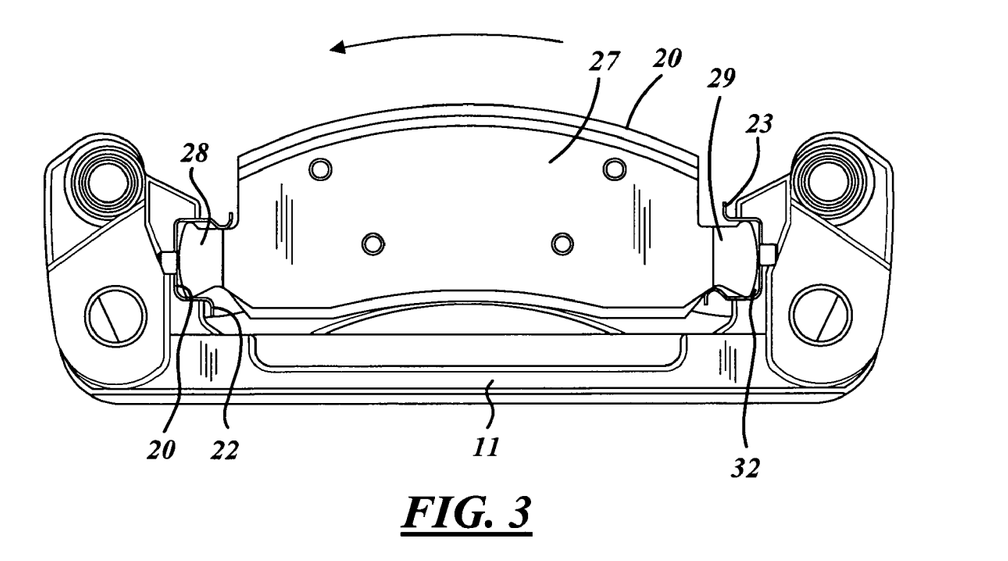
FIG. 3 is a side view of an anchor plate assembly according to the first preferred embodiment of the present invention.

FIG. 3 illustrates a side view of the outer brake pad 20 mounted to the anchor plate 11. The brake pad 20 includes a base portion 27, a first ear portion 28, and a second ear portion 29. The first ear portion 28 is integrally formed with the base portion 27 and extends outwardly from the base portion 27. The second ear portion 29 is integrally formed with the base portion 27 and extend extends outwardly from the base portion 27. The first ear portion 28 and the second ear portion 29 extend outwardly in opposite directions from one another.

The anchor plate 11 includes a first groove portion 30. The first clip 22 is seated within the first groove portion 30. The first ear portion 28 is retained and located in the first groove portion 30 by the first clip 22.

The anchor plate 11 further includes a second groove portion 32 opposite and distantly spaced from said first groove portion 30. The second clip 23 is seated within the second groove portion 32. The second ear portion 29 is retained and located in the second groove portion 32 by the second clip 23. The first clip 22 and the second clip 23 prevent the brake pad 20 from torquing when braking friction is applied by the brake pad 20 to a brake rotor (not shown).

Figure 4A:
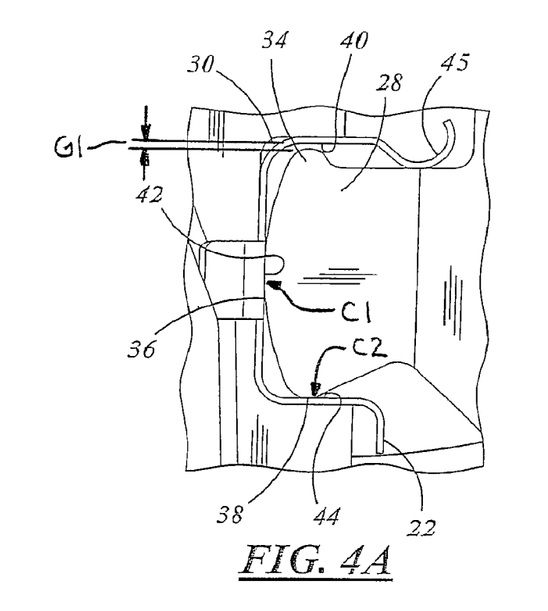
FIG. 4A is a section view of a trailing end of a brake pad according to the first preferred embodiment of the present invention.

FIG. 4A illustrates an enlarged section view of the first ear portion 28 retained by the first clip 22. In the preferred embodiment, the first ear portion 28 includes a first upper section 34 that is curved, a first central section 36 that is curved, and a first lower section 38 that is curved, each being disposed within the first clip 22. The first upper section 34 is juxtaposed to a first upper side surface 40 of the first clip 22. The first central section 36 is formed along a central region of the first ear portion 28. The first central section 36 is juxtaposed to a first central side surface 42 of the first clip 22. The first lower section 38 is formed along a lower region of the first ear portion 28. The first lower section 38 is juxtaposed to a first lower side surface 44 of the first clip 22.

Contact between the first central section 36 and the first central side surface 42, and the first lower section 38 and the first lower side surface 44 includes a first defined contact location C1 and a second defined contact location C2, respectively. The term defined contact location may include a point of contact, line of contact, or area of contact between a respective ear section and side surface of a respective clip. For example, in FIG. 4A, the first central section 36 and the first lower section 38 are curved cylindrical surfaces and contact with the substantially flat respective side surfaces of the first clip 22 results in a tangential line of contact given the axial length of the cylindrical curved surface. Alternatively, if a respective section where spherical as opposed to cylindrical, then a tangential point of contact would result from the contact with the substantially flat respective side surfaces of a respective clip. Knowing the defined repeatable contacting locations allows NVH concerns to be diagnosed and addressed more readily.

The first clip 22 is a biasing clip. A first clip biasing spring member 45 extends outwardly from the first groove portion 30 and exerts a directional force on the first ear portion 28. In the preferred embodiment, the biasing spring member 45 exerts a downward force on the first ear portion 28 for maintaining the defined contact locations between the first central and lower section 36 and 38 of first ear portion 28 and the first central and lower side surface 42 and 44 of the first clip 22, respectively. Regardless of the drive direction of the brake rotor (not shown), the first clip 22 will bias the first ear portion 28 for maintaining the respective defined contact locations during all brake apply operations, as well as non-brake apply operations.

Figure 4B:
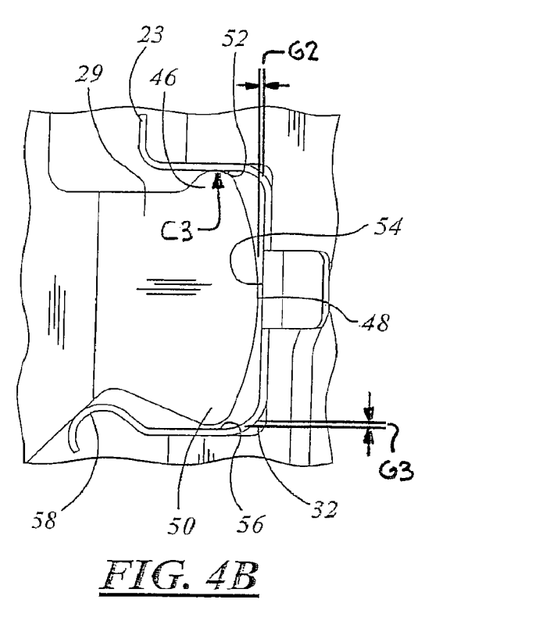
FIG. 4B is a section view of a leading end of a brake pad according to the first preferred embodiment of the present invention.

FIG. 4B illustrates an enlarged section view of the second ear portion 29 retained by the second clip 23. In the preferred embodiment, the second ear portion 29 includes a second upper section 46 that is curved, a second central section 48 that is curved, and a second lower section 50 that is curved where each section is disposed within the second clip 23. The second upper section 46 is juxtaposed to a second upper side surface 52 of the second clip 23. The second central section 48 is formed along a central region of the second ear portion 29. The second central section 48 is juxtaposed to a second central side surface 54 of the second clip 23. The second lower section 50 is formed along a lower region of the second ear portion 29. The second lower section 50 is juxtaposed to a second lower side surface 56 of the second clip 23.

Contact between the second upper section 46 and the second upper surface 52 includes a third defined contact location C3. The second upper section 46 is a curved cylindrical surface and contact with the substantially flat second upper surface 52 of the second clip 23 results in a tangential line of contact. As discussed earlier, the term defined contact location may include a point of contact, line of contact, or area of contact between a respective ear portion and side surface of a respective clip depending on the shape of the respective ear surface and the respective side surface of the clip.

The second clip 23 is a biasing clip. A second clip biasing spring member 58 extends outwardly from the second groove portion 32 and exerts a directional force on the second ear portion 29. In the preferred embodiment, the biasing spring member 57 exerts an upward force on the second ear portion 29 for maintaining the third defined contact location between the second upper section 46 of the second ear portion 29 and the second upper side surface 52 of the second clip 23, respectively. Regardless of the drive direction of the brake rotor (not shown), the second clip 23 will bias the second ear portion 29 for maintaining the third defined contact location during all brake apply operations, as well as non-brake apply operations.

As a result, the three defined contact locations are consistently maintained during all braking operations. Having defined repeatable points of contact allows NVH concerns to be diagnosed easier than if the contacting locations between a respective ear portion and respective clip were non-repeatable.

In both FIGS. 4A and 4B, gaps are shown where no contact is made between a respective side surface of a respective clip and a respective ear portion during a non-braking operation. For example, in FIG. 4A a first gap G1 is maintained between the first upper side surface 40 and the first upper section 34 during a brake apply operation. In addition, in FIG. 4B, a second gap G2 is maintained between the second central side surface 54 and the second central section 48, and a third gap G3 is maintained between the third lower side surface 56 and the third lower section 50 during a brake apply operation. Each of the gaps are maintained for preventing excessive wrap-up during a reverse brake apply operation.

Figure 5A:
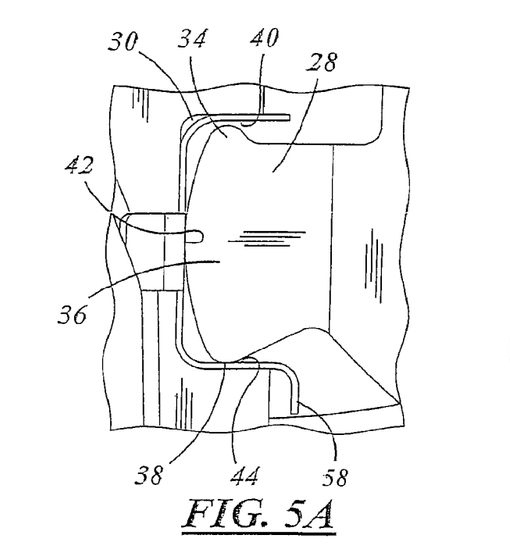
FIG. 5A is a section view of a trailing end of the brake pad according to a second preferred embodiment of the present invention.
Figure 5B:
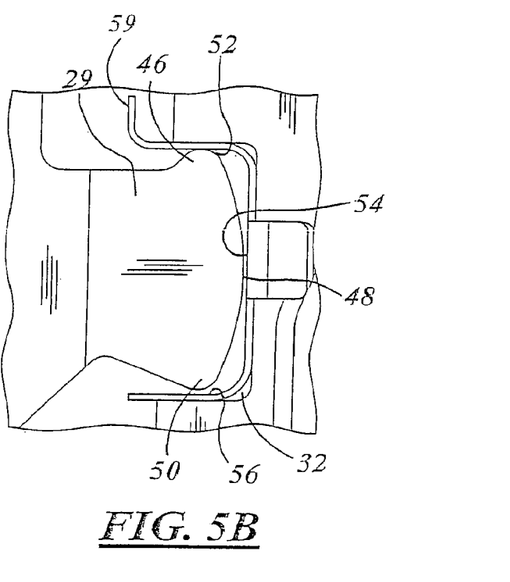
FIG. 5B is a section view of a leading end of the brake pad according to the second preferred embodiment of the present invention.

FIGS. 5A and 5B illustrate a second preferred embodiment of the present invention. Using the same numbers for same elements, FIG. 5A illustrates an enlarged view of the first ear portion 28 retained by a first clip 58, and FIG. 5B illustrates an enlarged view of the second ear portion 29 retained by a second clip 59. The first clip 58 and second clip 59 are similar to the first and second clips shown in FIGS. 4A and 4B respectively, except that neither the first clip 58 nor the second clip 59 include a spring biasing member. During a non-braking operation, the brake pad 20 is allowed to relax (i.e., retract). The defined contact locations between the respective ear portions and the respective clips are not maintained during a non-braking operation. When a braking operation is initiated, the respective sections of the respective ear portions and the associated side surfaces of the respective clips contact one another, as discussed earlier. The three defined contact locations are maintained during each braking operation while the braking rotor is rotated in the direction shown in FIG. 3. Alternatively, a different set of defined contact locations may result depending upon the direction that the brake rotor is rotating. As discussed earlier, in addition to the direction that the braking rotor is rotating, the position of the respective brake pads to the brake rotor and the position of the respective brake pads to the contacting pistons will determine the directional rotation (i.e., torquing) of each respective brake pad. As a result, although the defined contact locations may be different depending upon the direction a respective brake pad torques, one of the respective clips will have two respective defined contact locations and the other respective clip will have a single respective defined contact location for a respective brake pad. That is, a respective braking pad and its respective abutting clips will result in three defined contact locations during a brake apply operation.

Figure 6:
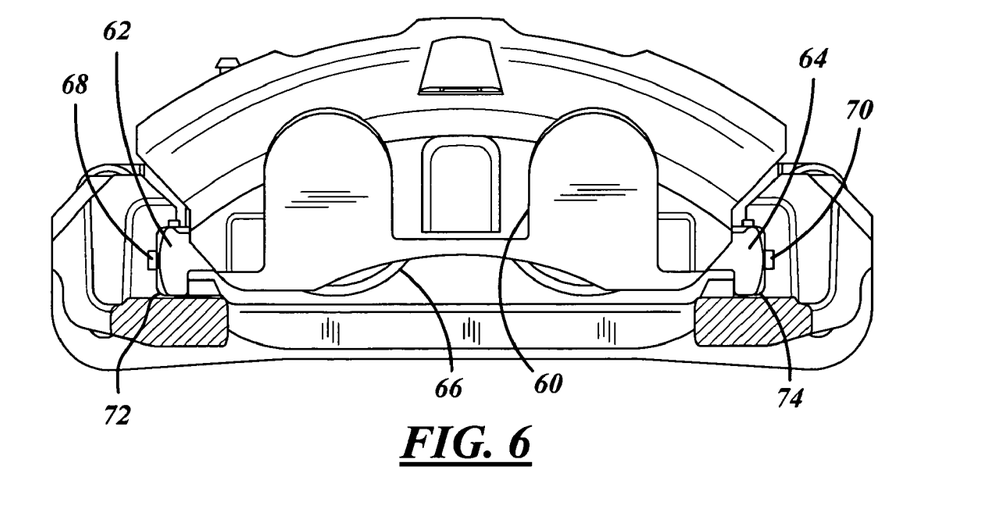
FIG. 6 illustrates a side view of a brake pad according to a third preferred embodiment of the present invention.

FIG. 6 illustrates a push-pull brake pad according to a third preferred embodiment of the present invention. FIG. 6 illustrates a brake pad 60 having a first ear portion 62 and a second ear portion 64 extending outwardly from a base portion 66. The first ear portion 62 and the second ear portion 64 extend outwardly in opposite directions from one another.

A first clip 68 and a second clip 70 are seated within a first groove portion 72 and a second groove portion 74, respectively. The first ear portion 62 and second ear portion 64 are retained by the first clip 68 and second clip 70, respectively.

Figure 7A:
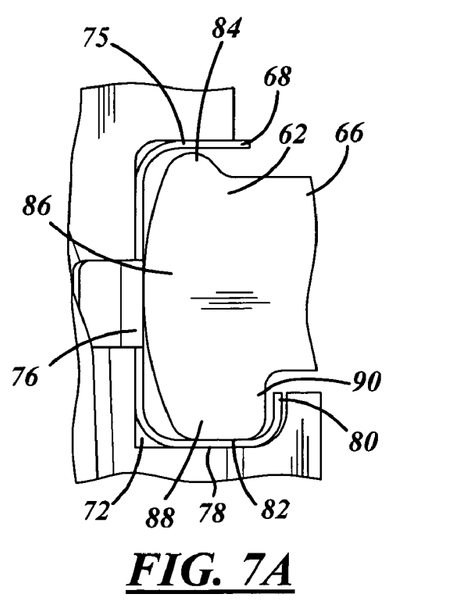
FIG. 7A is a section view of a trailing end of the brake pad according to the third preferred embodiment of the present invention.

FIG. 7A illustrates an enlarged view of the first ear portion 62 (as shown in FIG. 6) seated within the first clip 68 and first groove portion 72. The first clip 68 is generally rectangular shaped and includes an upper side surface 75, a central side surface 76, and a lower side surface 78. The lower side surface 78 includes a lip section 80 and a horizontal section 82. The lip section 80 extends vertically from the horizontal section 82.

The first ear portion 62 includes a first upper section 84, a first central section 86 and a first lower section 88. The first upper section 84 includes a curve surface juxtaposed to the upper side surface 75. The first central section 86 includes a curved surface juxtaposed to the central side surface 76. The first lower section 88 includes a curved surface juxtaposed to the lip section 80 of the first clip 68.

When a forward drive braking torque is applied to the brake rotor (not shown), the brake pad 60 (shown in FIG. 6) rotates in the direction of the rotating rotor. Since the first central section 86 and the first lower section 88 are curved surfaces, contact with the substantially flat respective side surfaces of the first clip 68 results in a first defined contact location and a second defined contact location. The tangential contact results in a line of contact for a cylindrical shaped ear portion. Alternatively, the defined contact location may include a point of contact or a line of contact depending on the shape of the contacting surfaces between a respective ear portion and a respective side surface of the clip.

When the first lower section 88 and first central section 86 contacts the lip section 80 and the first central side surface 76, respectively, the first ear portion 62 is in tension with the first clip 68 and is attempting to pull itself from the first clip 68.

Figure 7B:
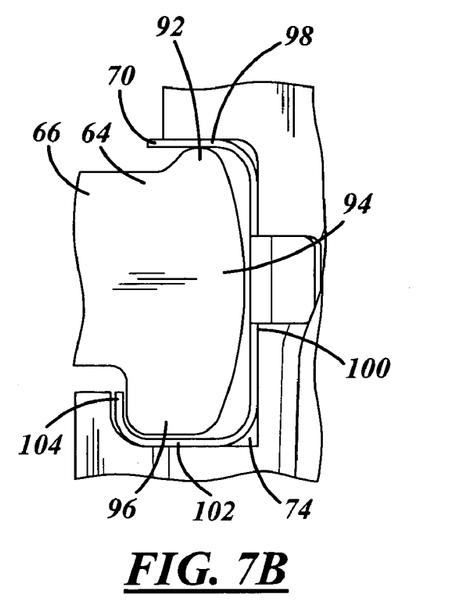
FIG. 7B is a section view of a leading end of the brake pad according to the third preferred embodiment of the present invention.

FIG. 7B illustrates an enlarged view of the second ear portion 64 in contact with the second clip 70. The second ear portion 64 includes a second upper section 92, a second central section 94, and a second lower section 96. Each of the respective sections are curved or includes some type of projection which provides a defined contact location with an abutting surface. The second clip 70 is a mirror of the first clip 68 and includes a second upper side surface 98, a second central side surface 100, and a lower side surface 102. A lip section 104 forms a portion of the lower side surface 102 of the second clip 70.

When a forward drive braking torque is applied to the brake rotor (not shown), the first upper section 92 contacts the second upper side surface 98 resulting in the third defined contact location. As discussed earlier, the defined contact location is a line of contact. Alternatively depending on the shape of the respective ear portion, the defined contact location may include a point of contact or an area of contact.

As only the upper section 92 of the second ear portion 64 contacts the second upper side surface 98 of the second clip 70, the second ear portion 64 is in compression with the second clip 70 in which the second upper section 92 is pushing only against the second upper side surface 98. As a result, the second ear portion 64 has a push relationship with the second clip 70 and the first ear portion 62 has a pull relationship with the first clip 68.

Figure 8A:
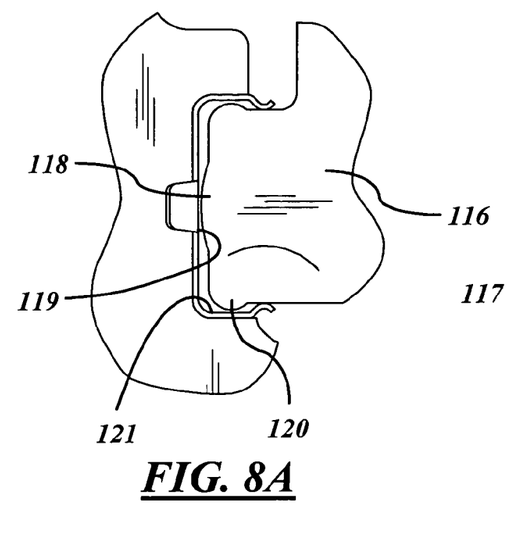
FIG. 8A is a section view of a trailing end of a brake pad according to a fourth preferred embodiment of the present invention.
Figure 8B:
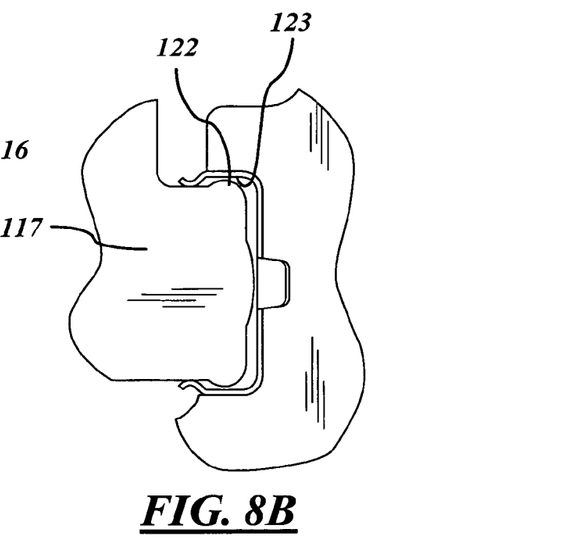
FIG. 8B is a section view of a leading end of a brake pad according to the fourth preferred embodiment of the present invention.

FIG. 8A and FIG. 8B illustrate enlarged views of respective ear portions of a brake pad according to a fourth preferred embodiment of the present invention. The respective ear portions 116 and 117 are similar to that shown in FIGS. 5A and 5B, except a different ear portion configuration is utilized. Similar to FIGS. 5A and 5B, three respective defined contact locations result from contact between the first central section 118 and the first central side surface 119, the first lower section 120 and the first lower side surface 121, and the second upper section 122 and the second upper side surface 123 which are formed when a torque from the braking operation is exerted on a respective braking pad.

Figure 9A:
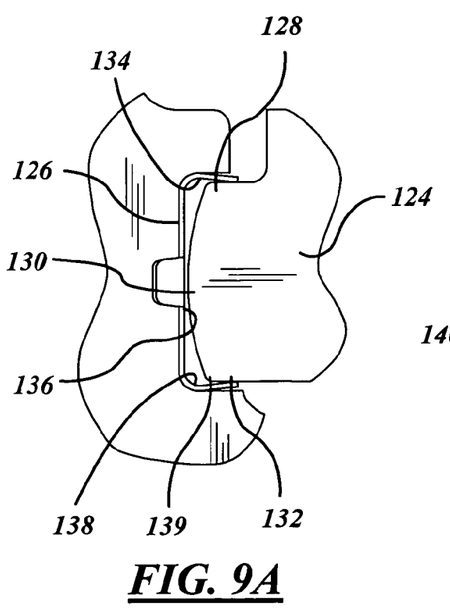
FIG. 9A is a section view of a trailing end of a brake pad according to the fifth preferred embodiment of the present invention.
Figure 9B:
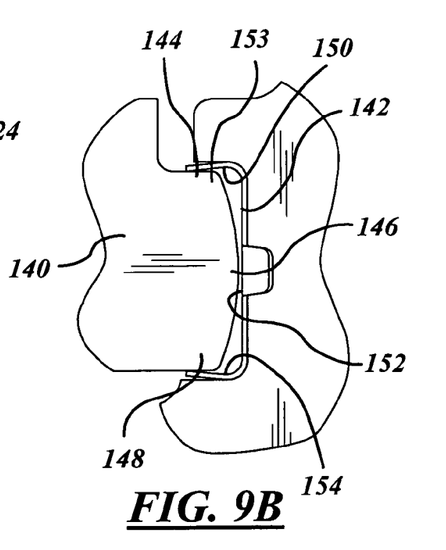
FIG. 9B is a section view of a leading end of a brake pad according to the fifth preferred embodiment of the present invention.

FIG. 9A and FIG. 9B illustrate enlarged views of respective ear portions according to a fifth preferred embodiment of the present invention. FIG. 9A illustrates a first ear portion 124 retained by a first clip 126. The first ear portion 124 includes a first upper section 128 that is substantially flat, a first central section 130 that is curved, and a first lower section 132 that is substantially flat. The first upper section 128 is juxtaposed to a first upper side surface 134 of the first clip 126. The first central section 130 is formed along a central region of the first ear portion 124. The first central section 130 is juxtaposed to a first central side surface 136 of the first clip 126. The first lower section 132 is formed along a lower region of the first ear portion 124. The first lower section 132 is juxtaposed to a first lower side surface 138 of the first clip 126.

Similarly, in FIG. 9B, a second ear portion 140 is retained by a second clip 142. The second ear portion 140 includes a second upper section 144 that is substantially flat, a second central section 146 that is curved, and a second lower section 148 that is substantially flat. The second upper section 144 is juxtaposed to a second upper side surface 150 of the second clip 126. The second central section 146 is formed along a central region of the second ear portion 140. The second central section 146 is juxtaposed to a second central side surface 152 of the second clip 142. The second lower section 148 is formed along a lower region of the second ear portion 140. The second lower section 148 is juxtaposed to a second lower side surface 154 of the second clip 142.

Referring both the FIGS. 9A and 9B, when braking is applied in a first direction (FIG. 9A being the trailing portion and FIG. 9B being the leading portion), contact between the first central section 130 and the first central side surface 136 provides a first defined contact location. Contact between the first lower section 132 and the first lower side surface 138 defines a second defined contact location. A third defined contact location results from contact between the second upper section 144 and the second upper side surface 150.

Depending on the amount of directional movement of the respective ear portions in their respective clips from the respective torque applied will determine whether the defined contacting locations are lines of contact or areas of contact. For example, if the torquing of the respective brake pad results in contact between the substantially flat portion of the first lower section 132 and the first lower side surface 138, then the second defined contact location between these two respective surfaces will result in a respective area of contact. In addition, the third defined contact location will be an area of contact resulting from the contact between the second upper section 144 of the second ear portion 140 and the second upper side surface 150 of the second clip 142. The second defined contact location between the first central section 130 of the first ear portion 124 and the first central side surface of the first clip 126 is a line of contact as result of the curved cylindrical surface contacting the respective flat side surface of the clip. Alternatively, if the rotational movement (i.e., torquing) of the brake pad is such that a corner 139 of the first lower section 132 contacts the first lower side surface 138, then the second defined contact location will include a line of contract as opposed to an area of contact. Similarly, the third defined contact location between a corner 153 of the second upper section 144 of the second ear portion 140 and the second upper side surface 150 of the first clip 126 will also result in a line of contact.

Figure 10A:
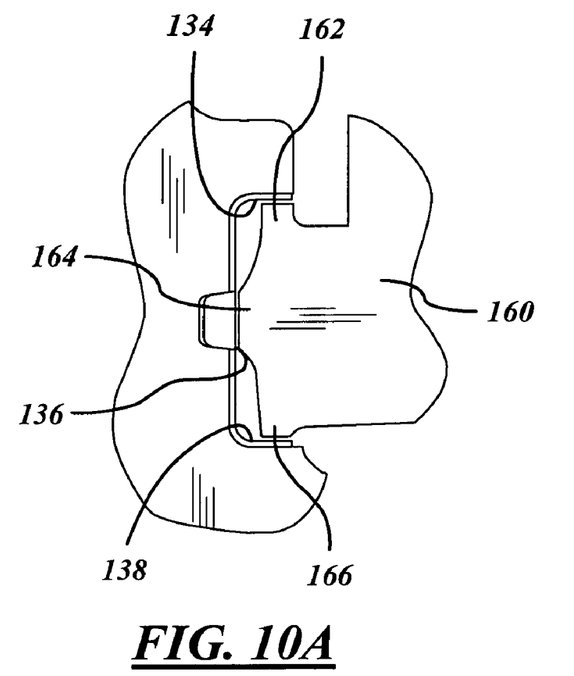
FIG. 10A is a section view of a trailing end of a brake pad according to the sixth preferred embodiment of the present invention.
Figure 10B:
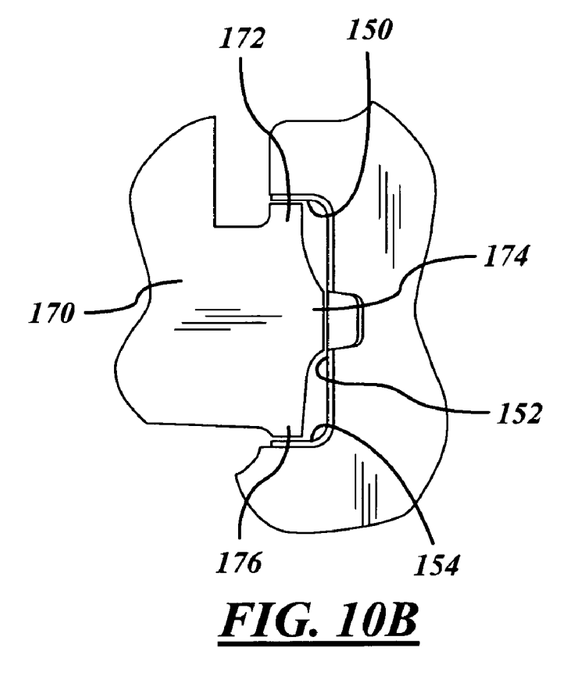
FIG. 10B is a section view of a leading end of a brake pad according to the sixth preferred embodiment of the present invention.

FIGS. 10A and 10B illustrate a sixth preferred embodiment of the present invention. Referring to FIG. 10A, a first ear portion 160 is retained in the first clip 126. The first ear portion 160 includes a first upper section 162 that is substantially flat, a first central section 164 that is curved, and a first lower section 166 that is substantially flat. A first upper section 162 is formed along an upper region of the first ear portion 160 and is juxtaposed to a first upper side surface 134 of the first clip 126. The first central section 164 is formed along a central region of the first ear portion 160 and is juxtaposed to a first central side surface 136 of the first clip 126. The first lower section 166 is formed along a lower region of the first ear portion 160 and is juxtaposed to a first lower side surface 138 of the first clip 126.

Similarly, in FIG. 10B, a second ear portion 170 is retained by a second clip 142. The second ear portion 170 includes a second upper section 172 that is substantially flat, a second central section 174 that is curved, and a second lower section 176 that is substantially flat, each respective section being disposed within the second clip 142. The second upper section 172 is formed along an upper region of the first second ear portion 170 and is juxtaposed to a second upper side surface 150 of the second clip 126. The second central section 174 is formed along a central region of the second ear portion 170 and is juxtaposed to a second central side surface 152 of the second clip 142. The second lower section 176 is formed along a lower region of the second ear portion 170 and is juxtaposed to a second lower side surface 154 of the second clip 142.

Referring to both the FIGS. 10A and 10B, when braking is applied in a first direction (FIG. 10A being the trailing portion and FIG. 10B being the leading portion), contact between the first central section 162 and the first central side surface 164, and the first lower section 166 and the first lower side surface 138 includes a first defined contact location and a second defined contact location, respectively. A third defined contact location results from contact between the second upper section 172 and the second upper side surface 150. Each of the defined contact locations includes area of contacts which are the results of the respective substantially flat sections of each respective ear portion abutting the respective side surfaces of the respective clips.

The three defined contact locations are consistently maintained during all braking operations. Although the defined contact locations are larger areas of contact in comparison to lines of contact or points of contact, having defined repeatable points of contact allows NVH concerns to be diagnosed easier than if the contacting locations between a respective ear portion and respective clip were non-repeatable. It should be noted that the he substantially flat section as illustrated in FIGS. 10A and 10B may be used in combination an ear portion have curved section as well.

Figures 11A, 11B:
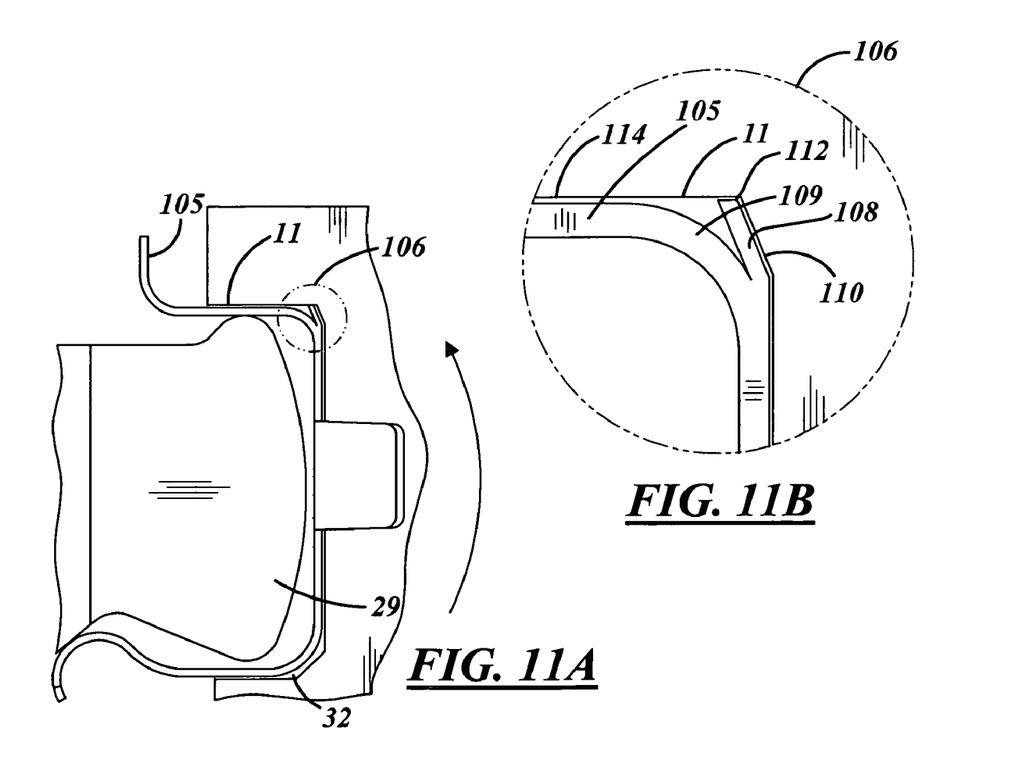
FIG. 11A is a section view of a leading end of a brake pad according to a seventh preferred embodiment of the present invention.
FIG. 11B is an enlarged view of the encircled section shown in FIG. 10A.

FIGS. 11A and 11B illustrate a seventh preferred embodiment of the present invention. Using the same numbers for same elements, FIG. 11A illustrates an enlarged view of the second ear portion 29 retained by a clip 105, and FIG. 11B illustrates an enlarged view 106 of the encircled section of FIG. 11A. Clip 105 is similar to the second clip 23, shown in FIG. 2, with the addition of an anti-rotation feature. A barb member 108 is a raised surface section of the clip 105 that is bent upward from a corner portion 109 of the clip 105. The barb member 108 extends outward from the corner portion 109 at a predetermined angle. Preferably, the barb member 108 is angled at a same degree as an angled corner section 110 of the anchor plate 11. An end 112 of the barb member 108 abuts an upper surface 114 of the anchor plate 11 within the second groove portion 32.

When the braking is applied, the braking pad 21 (shown in FIG. 2) desires to rotate in the driven direction of the wheel (e.g. clockwise as shown). The second ear portion 29 exerts a force against the second upper side surface 114 of the clip 105. As the force is applied to the clip 105, the barb member 108 secures the clip 105 to the second upper side surface 52 thereby preventing rotation of the clip 105 in the clockwise direction. Moreover, a respective barb member could be added to each respective clip that mates with a respective ear portion for preventing rotation of the respective clips when braking is applied.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, various embodiments may be utilized having ear portions that use either flat surface sections or curved surface sections either individually or in combination without departing from the scope of the invention.

What is claimed is:

1. A brake pad assembly adapted for use in a disc brake assembly comprising:
    a brake pad including a base portion, a first ear portion, and an opposed second ear portion, said first ear portion and said second ear portion extending outwardly from said base section, said first ear portion including a first upper section, a first central section, and a first lower section, said second ear portion including a second upper section, a second central section, and a second lower section;
    a first clip for receiving said first ear portion, said first clip including a first upper side surface, a first central side surface, and a first lower side surface; and
    a second clip for receiving said second ear portion, said second clip including a second upper side surface, a second central side surface, and a second lower side surface;
    wherein said first ear portion includes a first defined contact location, a second defined contact location, and a first gap in relation to said first clip during a brake apply operation of the disc brake assembly, and said second ear portion includes a third defined contact location, a second gap and a third gap in relation to said second clip during the brake apply operation.

2. The brake pad assembly of claim 1 wherein said first defined contact location is between said first central section of said first ear portion and said first central side surface of said first clip, wherein said second defined contact location is between said first lower section of said first ear portion and said first lower side surface of said first clip, wherein said first gap is between said first upper section of said first ear portion and said first upper side surface of said first clip, wherein said third defined contact location is between said second upper section of said second ear portion and said second upper side surface of said second clip, wherein said second gap is between said second central side surface of said second ear portion and said second central side surface of said second clip, and wherein said third gap is between said second lower section of said second ear portion and said second lower side surface of said second clip.

3. The brake pad assembly of claim 2 wherein said first clip is a trailing clip during a forward drive brake apply operation, and wherein said second clip is a leading clip during said forward driver brake apply operation.

4. The brake pad assembly of claim 2 wherein said first clip is a leading clip during a reverse drive brake apply operation, and wherein said second clip is a trailing clip during said reverse drive brake apply operation.

5. The brake pad assembly of claim 2 wherein said first clip includes a biasing spring member for biasing said first ear portion in a biased position which maintains said first defined contact location between said first central section of said first ear and said first central side surface of said first clip, maintains said second defined contact location between said first lower section of said first ear portion and said first lower side surface of said first clip, and maintains said first gap between said first upper section of said first ear portion and said first upper side surface of said first clip, and wherein said second clip includes a biasing member which maintains said third defined contact location between said second upper section of said second ear portion and said second upper side surface of said second clip, maintains said second gap between said second central side surface of said second ear portion and said second central side surface of said second clip, and maintains said third gap between said second lower section of said second ear portion and said second lower side surface of said second clip.

6. A brake anchor plate assembly adapted for use in a disc brake assembly comprising:
   a brake pad including a base portion, a first ear portion, and an opposed second ear portion, said first ear portion and said second ear portion extending outwardly from said base section, said first ear portion including a first upper section, a first central section, and a first lower section, said second ear portion including a second upper section, a second central section, and a second lower section;
   a stationary member for locating said brake pad, said stationary member including a first groove portion and a second groove portion;
   a first clip disposed in said first groove portion for receiving said first ear portion, said first clip including a first upper side surface, a first central side surface, and a first lower side surface; and
   a second clip disposed in said second groove portion for receiving said second ear portion, said second clip including a second upper side surface, a second central side surface, and a second lower side surface;
   wherein said first ear portion includes a first defined contact location, a second defined contact location, and a first gap in relation to said first clip during a brake apply operation of the disc brake assembly, and said second ear portion includes a third defined contact location, a second gap and a third gap in relation to said second clip during said brake apply operation.

7. The brake anchor plate assembly of claim 6 wherein said first defined contact location is between said first central section of said first ear portion and said first central side surface of said first clip, wherein said second defined contact location is between said first lower section of said first ear portion and said first lower side surface of said first clip, wherein said first gap is between said first upper section of said first ear portion and said first upper side surface of said first clip, wherein said third defined contact location is between said second upper section of said second ear portion and said second upper side surface of said second clip, wherein said second gap is between said second central side surface of said second ear portion and said second central side surface of said second clip, and wherein said third gap is between said second lower section of said second ear portion and said second lower side surface of said second clip.

8. The brake anchor plate assembly of claim 7 wherein said first clip is a trailing clip during a forward drive brake apply operation, and wherein said second clip is a leading clip during said forward driver brake apply operation.

9. The brake anchor plate assembly of claim 7 wherein said first clip is a leading clip during a reverse drive brake apply operation, and wherein said second clip is a trailing clip during said reverse drive brake apply operation.

10. The brake anchor plate assembly of claim 6 wherein said first gap, said second gap, and said third gap prevent wrap-up during said reverse drive braking operation.

11. The brake anchor plate assembly of claim 6 wherein said first clip includes a biasing spring member for biasing said first ear portion in a biased position which maintains said first defined contact location between said first central section of said first ear portion and said first central side surface of said first clip, maintains said second defined contact location between said first lower section of said first ear portion and said first lower side surface of said first clip, and maintains said first gap between said first upper section of said first ear portion and said first upper side surface of said first clip during said brake apply operation, and wherein said second clip includes a biasing member which maintains said third defined contact location between said second upper section of said second ear portion and said second upper side surface of said second clip, maintains said second gap between said second central side surface of said second ear portion and said second central side surface of said second clip, and maintains said third gap between said second lower section of said second ear portion and said second lower side surface of said second clip during said brake apply operation.

12. The brake anchor plate assembly of claim 6 wherein said first clip includes a biasing spring member for biasing said first ear portion in a biased position which maintains said first defined contact location between said first central section of said first ear portion and said first central side surface of said first clip, maintains said second defined contact location between said first lower section of said first ear portion and said first lower side surface of said first clip, and maintains said first gap between said first upper section of said first ear portion and said first upper side surface of said first clip during said brake apply operation, and wherein said second clip includes a biasing member which maintains said third defined contact location between said second upper section of said second ear portion and said second upper side surface of said second clip, maintains said second gap between said second central side surface of said second ear portion and said second central side surface of said second clip, and maintains said third gap between said second lower section of said second ear portion and said second lower side surface of said second clip during said brake apply operation.

13. The brake anchor plate assembly of claim 6 wherein said first clip includes a barb member operatively engaging said stationary member for preventing rotation of said first clip within said first groove.

14. The brake anchor plate assembly of claim 6 wherein said second clip includes a barb member for preventing rotation of said second clip within said second groove.

15. A disc brake assembly comprising:
   a caliper assembly;
   a first brake pad and a second brake pad each including a base portion, a first ear portion, and an opposed second ear portion, said first ear portion and said second ear portion extending outwardly from said base portion, each of said first ear portions including a first upper section, a first central section, and a first lower section, each of said second ear portions including a second upper section, a second central section, and a second lower section;
   a pair of stationary members coupled to said caliper assembly for locating said first and second brake pads, each of said stationary members including a first groove portion and a second groove portion;
   a pair of first clips disposed in said first groove portion of each stationary member for receiving said first ear portions, respectively, said pair of first clips each including a first upper side surface, a first central side surface, and a first lower side surface; and
   a pair of second clips disposed in said second groove portion of each stationary member for receiving said second ear portions, respectively, said pair of second clips each including a second upper side surface, a second central side surface, and a second lower side surface;
   wherein each of said first ear portions include a first defined contact location, a second defined contact location, and a first gap in relation to said pair of first clips during a brake apply operation of the disc brake assembly, and each of said second ear portions includes a third defined contact location, a second gap and a third gap in relation to said pair of second clips during said brake apply operation.

16. The disc brake assembly of claim 15 wherein said pair of first clips each include a biasing spring member for biasing each of said first ear portions in a biased position which maintains said first defined contact location between said first central sections of each said first ear portions and said first central side surfaces of said pair of first clips, maintains said second defined contact location between said first lower sections of each said first ear portions and said lower side surfaces of said pair of first clips, and maintains said first gap between said first upper sections of each of said first ear portions and said first upper side surfaces of said pair of first clips during said brake apply operation, and wherein said pair of second clips includes a biasing member which maintains said third defined contact location between said second upper sections of each said second ear portions and said second upper side surfaces of said pair of second clips, maintains said second gap between said second central side surfaces of each of said second ear portions and said second central side surfaces of said pair of second clips, and maintains said third gap between said second lower sections of each of said second ear portions and said second lower side surfaces of said pair of second clips during said brake apply operation.

17. The disc brake assembly of claim 15 wherein said pair of first clips each includes a barb member operatively engaging said pair of stationary members, respectively, for preventing rotation of said pair of first clips within each said first groove.

18. The brake anchor plate assembly of claim 15 wherein said pair of second clips each include a barb member operatively engaging said pair of stationary members, respectively, for preventing rotation of said pair of second clips within each said second groove.

* * * * *